US012385294B2

(12) United States Patent
Vršecký

(10) Patent No.: US 12,385,294 B2
(45) Date of Patent: Aug. 12, 2025

(54) DOOR HANDLE ASSEMBLY HAVING AN ADJUSTING MECHANISM FOR A DOOR HANDLE

(71) Applicant: Witte Automotive GmbH, Velbert (DE)

(72) Inventor: Petr Vršecký, Oloví (CZ)

(73) Assignee: Witte Automotive GmbH, Velbert (DE)

( * ) Notice: Subject to any disclaimer, the term of this patent is extended or adjusted under 35 U.S.C. 154(b) by 151 days.

(21) Appl. No.: 17/676,892

(22) Filed: Feb. 22, 2022

(65) Prior Publication Data

US 2022/0268063 A1 Aug. 25, 2022

(30) Foreign Application Priority Data

Feb. 23, 2021 (DE) ..................... 10 2021 201 683.9

(51) Int. Cl.

| | |
|---|---|
| ***E05B 79/06*** | (2014.01) |
| ***E05B 85/10*** | (2014.01) |
| ***E05B 85/18*** | (2014.01) |

(52) U.S. Cl.

CPC ............ *E05B 79/06* (2013.01); *E05B 85/107* (2013.01); *E05B 85/18* (2013.01)

(58) Field of Classification Search

CPC ........ E05B 79/06; E05B 85/107; E05B 85/18; E05B 81/28; E05B 81/77; E05B 85/103; E05B 85/10; E05B 81/76

See application file for complete search history.

(56) References Cited

U.S. PATENT DOCUMENTS 6,698,262 B2 * 3/2004 Wittwer .................. E05B 77/34 292/DIG. 31
11,598,130 B2 * 3/2023 Sha ......................... E05B 81/90

(Continued)

FOREIGN PATENT DOCUMENTS

CN 102597392 A 7/2012
CN 103339334 A 10/2013

(Continued)

OTHER PUBLICATIONS

China National Intellectual Property Administration, Office Action in Application No. CN202210091141.3, dated Apr. 29, 2023, 26 pages.

(Continued)

*Primary Examiner* — Kristina R Fulton
*Assistant Examiner* — Thomas L Neubauer
(74) *Attorney, Agent, or Firm* — Marshall & Melhorn, LLC

(57) ABSTRACT

A door handle assembly may have an adjustable door handle having a handle support structure and an adjusting mechanism for adjusting the door handle between a non-use position and a use position. The adjusting mechanism may have at least one drive unit and a force transfer element. The force transfer element can be moved by the drive unit between a closed position corresponding to the non-use position of the door handle, an open position corresponding to the use position of the door handle, and a correcting position. The force transfer element may be in operative connection to the handle support structure to move the door handle between the non-use position and the use position. The force transfer element, during a movement from the closed position into the correcting position, actuates the retraction device so that the door handle is moved into the non-use position.

15 Claims, 11 Drawing Sheets

(56) References Cited

U.S. PATENT DOCUMENTS

| | | | | |
|---|---|---|---|---|
| 2009/0039671 | A1 | 2/2009 | Thomas et al. | |
| 2021/0332620 | A1* | 10/2021 | Rhein | E05B 85/103 |

FOREIGN PATENT DOCUMENTS

| | | | |
|---|---|---|---|
| CN | 110023575 | A | 7/2019 |
| CN | 112313388 | A | 2/2021 |
| DE | 10015887 | C1 | 1/2002 |
| DE | 102008036426 | A1 | 5/2009 |
| WO | 2020078914 | A1 | 4/2020 |

OTHER PUBLICATIONS

German Patent and Trademark Office, Office Action in Application No. 10 2021 201 683.9, dated Nov. 12, 2021, 6 pages, Munich, Germany.

* cited by examiner

DOOR HANDLE ASSEMBLY HAVING AN ADJUSTING MECHANISM FOR A DOOR HANDLE

FIELD

The invention relates to a door handle assembly having an adjusting mechanism for a door handle.

BACKGROUND

Vehicle doors typically comprise an outer door handle which is mechanically or electrically coupled to a locking mechanism. For example, actuating the door handle moves the locking mechanism from a locked position into an unlocked position in order to allow the vehicle door to be opened. The vehicle door comprises, for example, a door handle in which an outer surface is positioned so as to be approximately flush with an outer surface of an outer vehicle door wall when the door handle is in a non-use position. By means of an adjusting mechanism, the door handle can be moved outward into a use position, such that it can be grasped by a user.

SUMMARY

DE 10 2008 036 426 A1 discloses a handle arrangement for a vehicle door and a method for operating the handle arrangement. The door handle assembly comprises a pivot bracket mounted in the vehicle door, a handle arm pivotably mounted on the pivot bracket, a handle that can be aligned so as to be flush to a door handle cutout, and a motor assembly that is operatively engaged with the handle arm in order to selectively pivot the handle arm relative to the pivot bracket.

DE 100 15 887 C1 discloses an access system for a vehicle. In the case of the access system, an access authorization available outside the vehicle acts on identification means arranged in the vehicle. If the identification means respond, control means, which act on a door lock from a door handle, are transferred from their ineffective position into an effective position. The door handle can be moved between three different positions. In the first position, the door handle is in a retracted position that cannot be grasped by the human hand. Said grasping is only possible when the door handle is in a protruding extended position. Subsequently, the door handle is moved manually to a third extended position, where the door lock is opened. In order to ensure more convenient actuation, it is proposed to connect an actuator to the linkage of the door handle in a non-positive manner and to make it reversible between a rest position and a working position.

The problem addressed by the present invention is that of providing a door handle assembly having an adjusting mechanism for a door handle that is improved in comparison with the prior art, and a vehicle having a vehicle door and a door handle assembly of this kind having an improved adjusting mechanism.

With regard to the door handle assembly, the problem is solved according to the invention by the features of the claims.

With regard to the vehicle, the problem is solved according to the invention by the features of the claims.

Further developments of the invention are the subject matter of the dependent claims.

A door handle assembly according to the invention comprises at least one adjustable door handle having a handle support structure and an adjusting mechanism for adjusting the door handle between a starting or non-use position and a use position. The adjusting mechanism comprises at least one drive unit, a force transfer element, and a retraction device coupled to the handle support structure. The force transfer element can be moved by the drive unit between a closed position corresponding to the starting or non-use position of the door handle, an open position corresponding to the use position of the door handle, and a correcting position. The force transfer element is in operative connection to the handle support structure during a movement between the closed position and the open position in order to move the door handle between the starting or non-use position and the use position, and, during a movement from the closed position into the correcting position, actuates the retraction device so that the door handle is moved into the starting or non-use position.

During normal operation of the adjusting mechanism, the force transfer element is moved between the closed position and the open position, the closed position corresponding to the starting or non-use position of the door handle and the open position corresponding to the use position of the door handle. In other words, during normal operation of the adjusting mechanism, the door handle is moved from the starting or non-use position into the use position by the movement of the force transfer element from the closed position into the open position, and is moved from the use position into the starting or non-use position by the movement of the force transfer element from the open position into the closed position.

The movement of the force transfer element from the closed position into the correcting position only takes place in the exceptional case that the door handle does not assume the starting or non-use position in the closed position of the force transfer element, for example because the door handle is not or is not completely shifted from the use position into the starting or non-use position by ice formation or contamination during a movement of the force transfer element from the open position into the closed position. In this exceptional case, during the movement from the closed position into the correcting position, the force transfer element actuates the retraction device so that the door handle is moved into the starting or non-use position. In other words, in the exceptional case that the door handle does not assume the starting or non-use position in the closed position of the force transfer element, the retraction device serves to move the door handle into the starting or non-use position. This advantageously ensures that the door handle is fully retracted even in exceptional cases.

In one embodiment of the door handle assembly, the adjusting mechanism has at least one bearing element on which the handle support structure and the door handle are arranged such that they can pivot about a pivot axis. Furthermore, the retraction device can have a lever mechanism by means of which the handle support structure is pivotable about the pivot axis. This embodiment of the door handle assembly implements the extension and retraction of the door handle by pivoting the handle support structure, which in particular allows a mechanically simple design of the retraction device having a lever mechanism.

In a further embodiment of the door handle assembly, the drive unit can be activated automatically for moving the force transfer element from the closed position into the correcting position if the door handle does not assume the starting or non-use position in the closed position of the force transfer element. For example, the door handle assembly is set up on a sensor unit which is set up to detect whether the door handle assumes the starting or non-use position in the closed position of the force transfer element. In this case, the door handle assembly has, for example, a control unit that is set up to activate the drive unit as a function of a sensor signal from the sensor unit. This ensures that an incomplete retraction of the door handle is automatically recognized and corrected. Furthermore, the control unit can be set up to activate the drive unit for moving the force transfer element from the correcting position into the closed position. As a result, after moving into the correcting position, the force transfer element is automatically moved back into the closed position and thus into the position corresponding to the starting or non-use position.

In a further embodiment of the door handle assembly, the drive unit is designed as a linear drive unit having an output element on the output side, which output element is connected to the force transfer element.

In one embodiment of the door handle assembly, the closed position of the force transfer element is arranged between the open position and the correcting position. As a result, the open position or the correcting position can be reached, in particular from the closed position of the force transfer element, without having to guide the force transfer element over the corresponding other position.

A vehicle according to the invention comprises at least one movable element, such as a vehicle door or a hatchback, which comprises a door handle assembly according to the invention.

Embodiments of the invention are explained in greater detail with reference to drawings, in which:

DETAILED DESCRIPTION

Corresponding parts are provided with the same reference signs in the figures.

Figure 1:
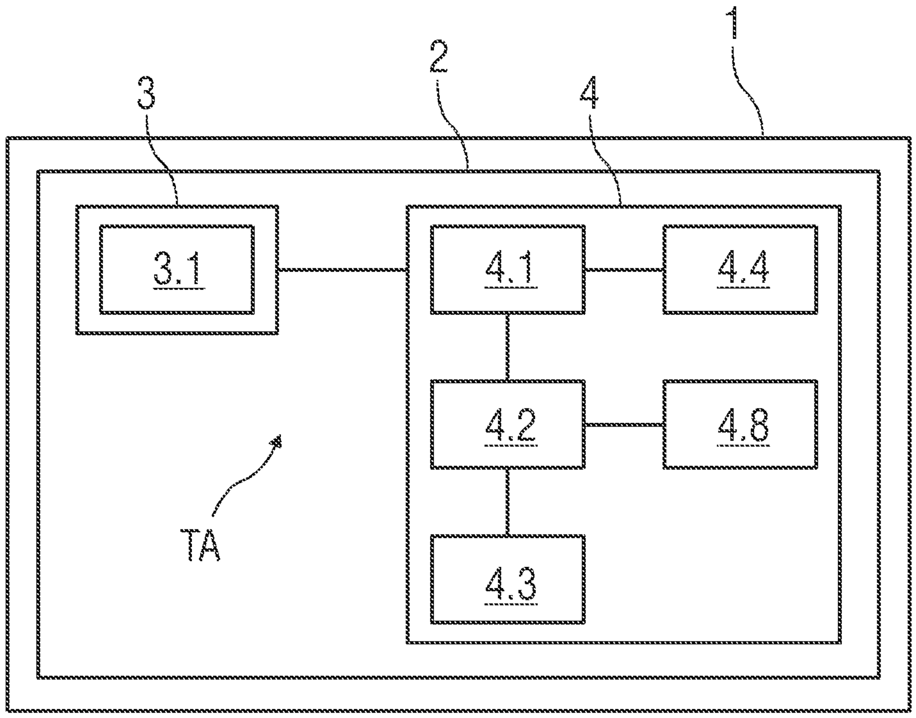
FIG. 1 is a schematic view of a block diagram of a vehicle having a door handle.

FIG. 1 is a block diagram of a vehicle 1.

The vehicle 1 comprises a vehicle door 2 having a door handle assembly TA comprising a door handle 3 having a handle support structure 3.1, which door handle can be extended from a starting or non-use position P1 into a use position P2 by means of an adjusting mechanism 4.

In the non-use position P1, the door handle 3 is arranged, in particular lowered, in a recess made in the vehicle door 2, such that the door handle 3 complements an outer contour of the vehicle door 2, in particular ends flush therewith. For its operation, the door handle 3 is movable, in particular extendable or pivotable, from the non-use position P1 (see, for example, FIG. 2) into the use position P2 (see, for example, FIG. 3), the door handle being able to be actuated by a user in said use position.

The adjusting mechanism 4 comprises, inter alia, a drive unit 4.1 and a control unit 4.2 which is provided for triggering the drive unit 4.1. According to the embodiment shown, the control unit 4.2 is connected to a detection unit 4.3 which comprises, for example, a capacitive sensor. The detection unit 4.3 detects, in particular, an approach of an object authorized to open the vehicle door 2 into a detection region, the control unit 4.2 activating and/or triggering the drive unit 4.1 after the object has been successfully identified and/or authenticated in order to switch the door handle 3 from the non-use position P1 into the use position P2 by means of a force transfer element 4.4 driven by the drive unit 4.1. The door handle 3 is automatically extended into the use position P2 by means of the adjusting mechanism 4. The door handle 3 can be lowered from the use position P2 into the non-use position P1 automatically after a predetermined period of time or after another actuation of the door handle 3. Furthermore, the control unit 4.2 is connected to a sensor unit 4.8 and is set up to activate the drive unit 4.1 in the manner described in more detail below as a function of a sensor signal from sensor unit 4.8. The sensor unit 4.8 detects whether the door handle 3 assumes the starting or non-use position P1 in a closed position of the force transfer element 4.4 (see, for example, FIG. 2).

Figure 2:
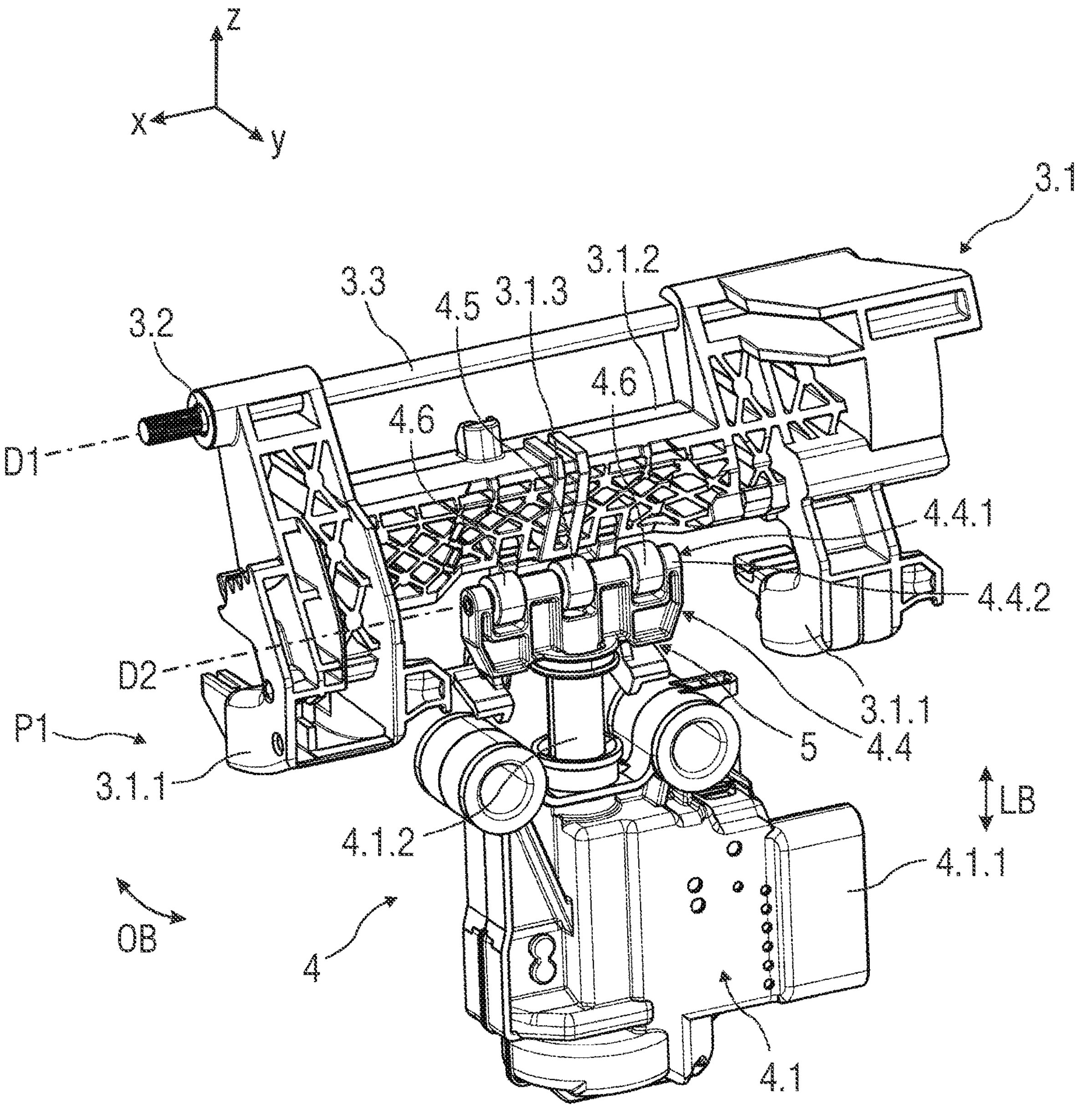
FIG. 2 is a schematic perspective view of an adjusting mechanism for the door handle and a handle support structure of the door handle.
Figure 3:
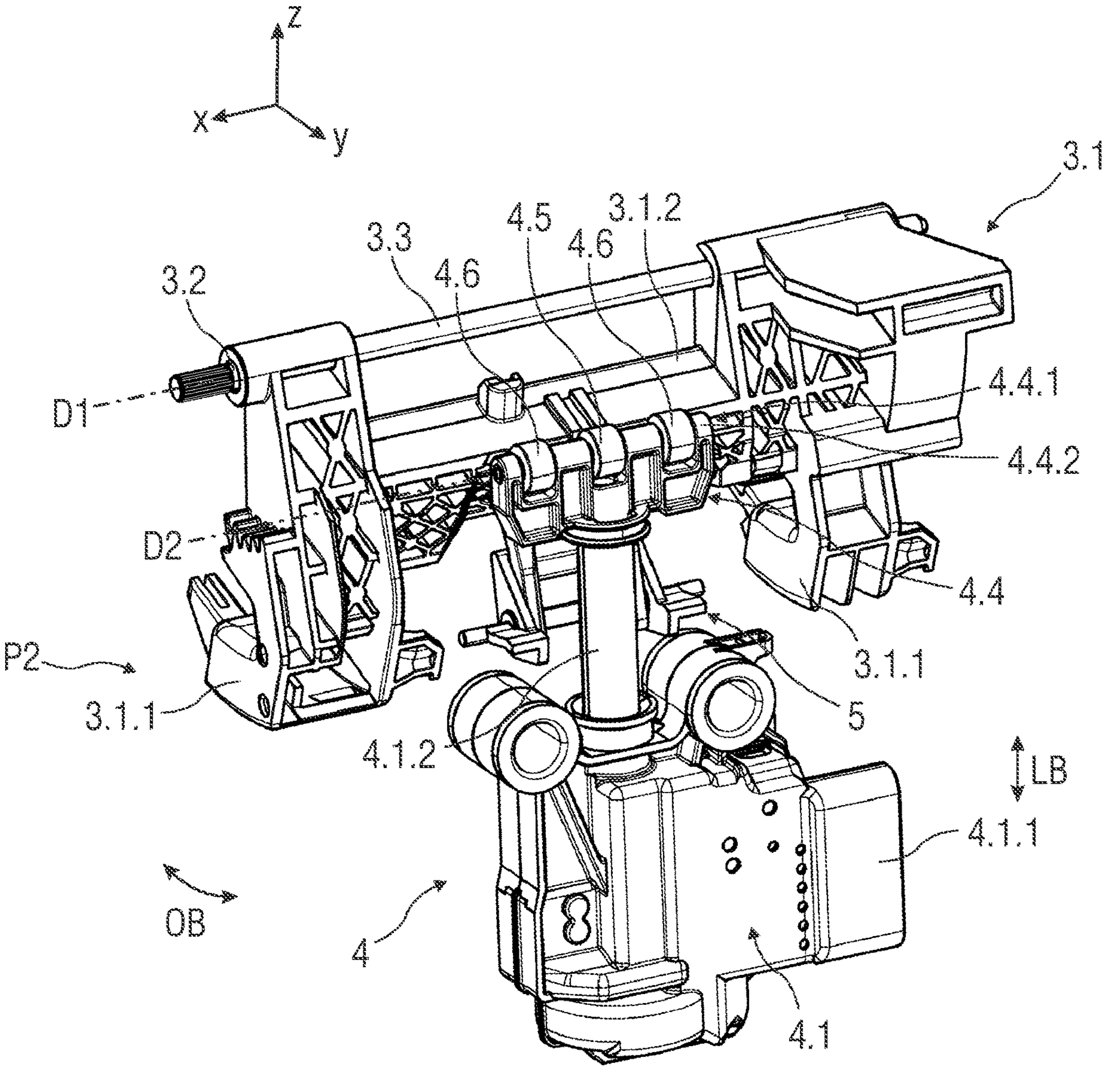
FIG. 3 is a schematic perspective view of an adjusting mechanism for the door handle and a handle support structure of the door handle.
Figure 4:
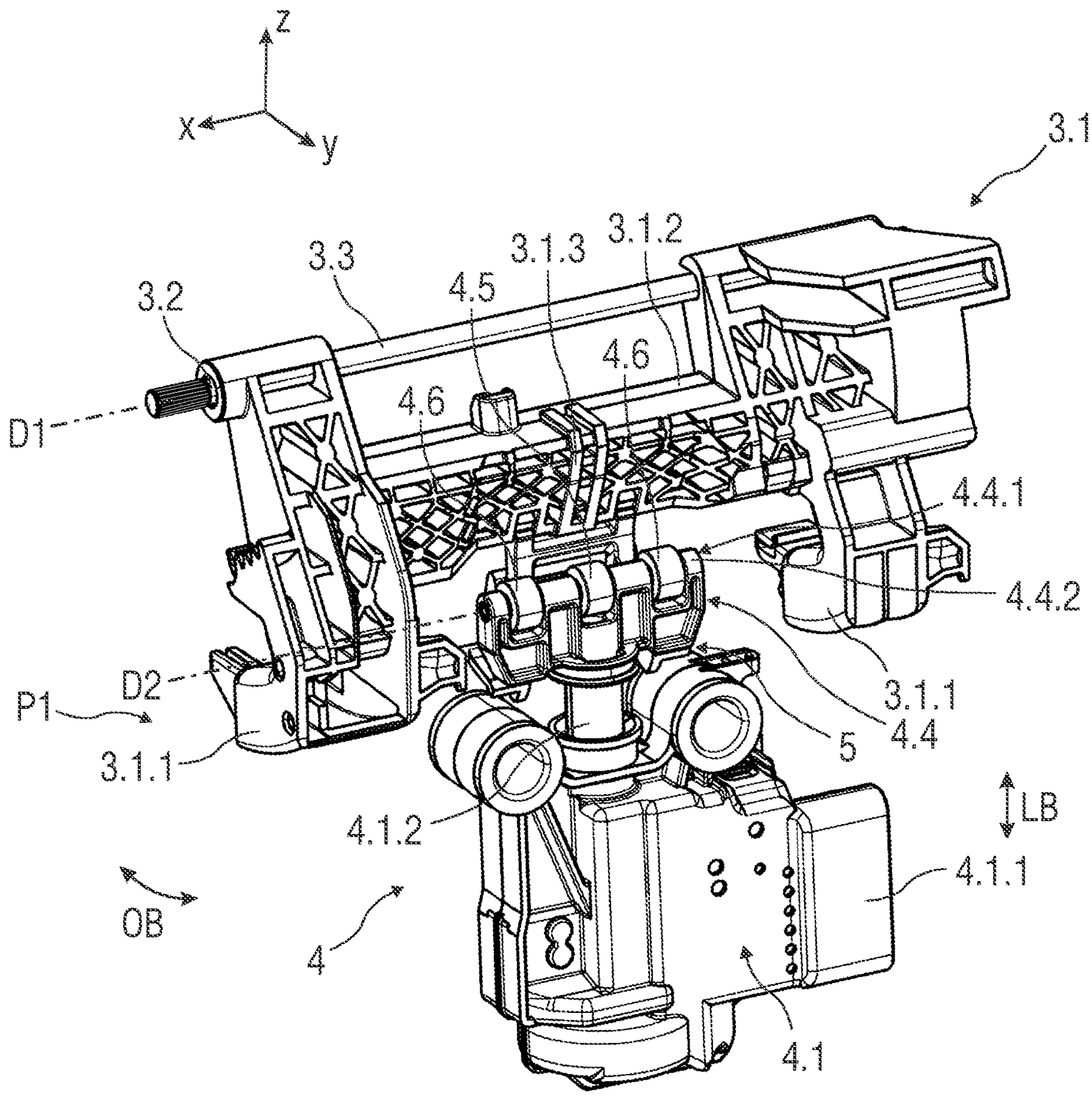
FIG. 4 is a schematic perspective view of an adjusting mechanism for the door handle and a handle support structure of the door handle.
Figure 5:
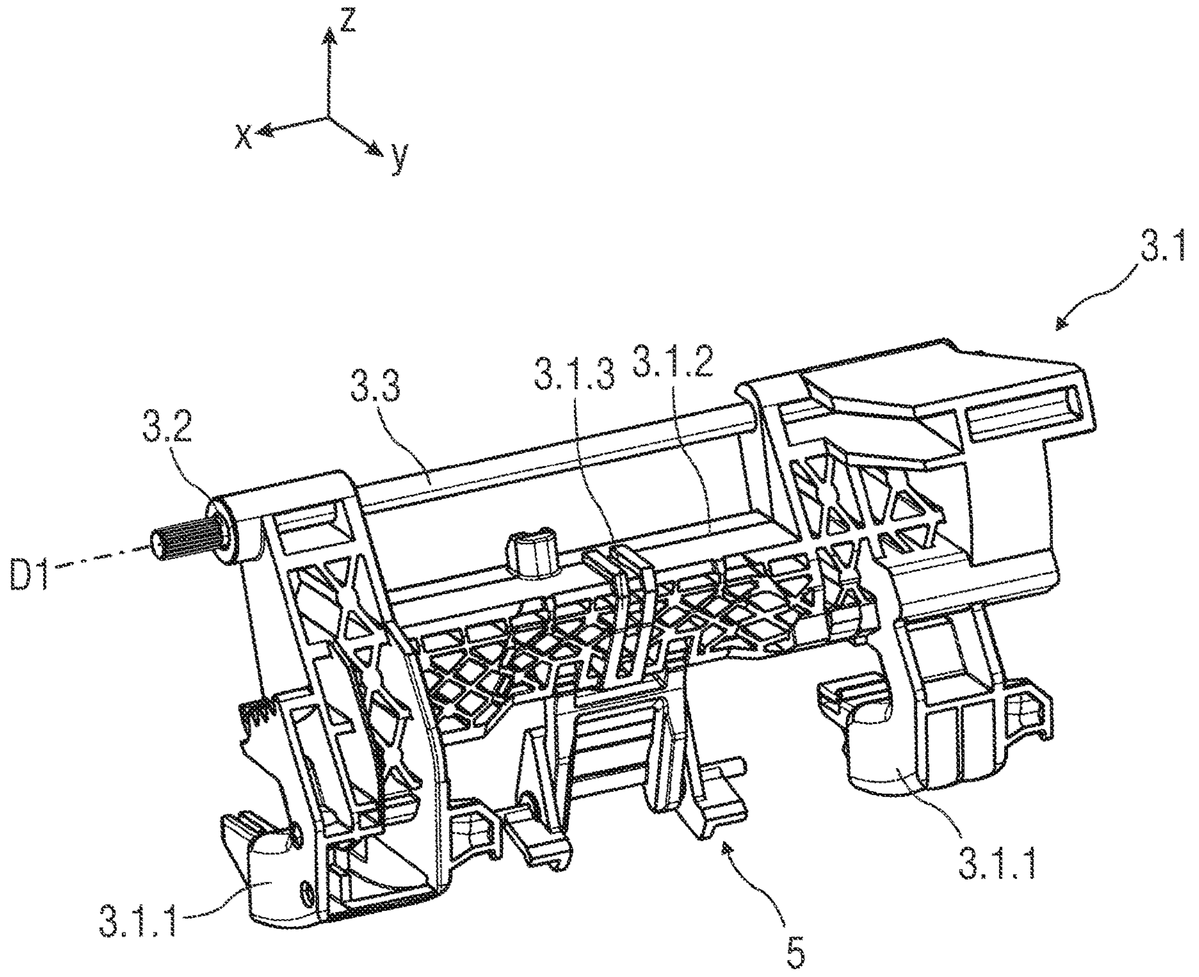
FIG. 5 is a schematic perspective view of the handle support structure and a retraction device of the adjusting mechanism.

The following FIG. 2 to 13 show the door handle assembly TA or parts thereof in more detail in different views. FIG. 2 to 4 show perspective views of the adjusting mechanism 4 and the handle support structure 3.1 in different positions of the force transfer element 4.4. FIG. 5 shows the handle support structure 3.1 and a retraction device 5 of the adjusting mechanism 4 that is coupled to the handle support structure 3.1. FIG. 6 to 9 are different views of the retraction device 5. FIG. 10 to 13 are sectional views of the door handle assembly TA in different positions of the door handle 3, the force transfer element 4.4, and the retraction device 5.

As shown in FIG. 2 to 4, the adjusting mechanism 4 comprises the at least one drive unit 4.1, the force transfer element 4.4, and the retraction device 5.

The force transfer element 4.4 can be moved by the drive unit 4.1 between a closed position shown in FIG. 2, an open position shown in FIG. 3, and a correcting position shown in FIG. 4. The closed position of the force transfer element 4.1 lies between the open position and the correcting position.

During normal operation of the adjusting mechanism 4, the force transfer element 4.4 is moved between the closed position and the open position, the closed position corresponding to the starting or non-use position P1 of the door handle 3, and the open position corresponding to the use position P2 of the door handle 3. In other words, during normal operation of the adjusting mechanism 4, the door handle 3 is moved from the starting or non-use position P1 into the use position P2 by the movement of the force transfer element 4.4 from the closed position into the open position, and is moved from the use position P2 into the starting or non-use position P1 by the movement of the force transfer element 4.4 from the open position into the closed position. For this purpose, the force transfer element 4.4 is in a direct operative connection to the handle support structure 3.1 via a roller mechanism 4.4.1 during a movement between the closed position and the open position in order to move the door handle 3, said roller mechanism being guided on the door handle 3, in particular in the handle support structure 3.1.

The movement of the force transfer element 4.4 from the closed position into the correcting position only takes place in the exceptional case that the door handle 3 does not assume the starting or non-use position P1 in the closed position of the force transfer element 4.4, for example because the door handle is not or is not completely shifted from the use position P2 into the starting or non-use position P1 by ice formation or contamination during a movement of the force transfer element 4.4 from the open position into the closed position. In this exceptional case, during the movement from the closed position into the correcting position, the force transfer element 4.4 actuates the retraction device 5 so that the door handle 3 is moved into the starting or non-use position P1, see FIG. 10 to 13 and their description.

The fact as to whether the door handle 3 assumes the starting or non-use position P1 in the closed position of the force transfer element 4.4 is detected by the sensor unit 4.8 and signaled to the control unit 4.2. The sensor unit 4.8 has, for example, a microswitch, the switching state of which signals the reaching of the starting or non-use position P1 of the door handle 3, or a similar sensor element. If the door handle 3 does not assume the starting or non-use position P1 in the closed position of the force transfer element 4.4, the control unit 4.2 activates the drive unit 4.1 in order to move the force transfer element 4.4 from the closed position into the correcting position.

The adjusting mechanism 4 also has a rotational or pivot axis D1, about which the door handle 3 can be moved, in particular pivoted or extended or retracted, from the non-use position P1 into the use position P2 or vice versa. The pivot axis D1 extends, for example, in parallel with a longitudinal axis X of the vehicle 1 when the door handle 3 is arranged on a side door of the vehicle 1.

In detail, the handle support structure 3.1 of the door handle 3 is mounted so as to be pivotable about the pivot axis D1 on a vehicle body of the vehicle 1. The handle support structure 3.1 is formed, for example, from two holding bars 3.1.1, in particular L-shaped or sickle-shaped holding bars 3.1.1, which are firmly connected to the door handle 3. The two holding bars 3.1.1 are spaced apart from one another in the direction of the longitudinal axis X and are connected to one another by means of a connecting bar 3.1.2. The connecting bar 3.1.2 is designed in particular as a guiding or sliding element for the roller mechanism 4.4.1. For example, the connecting bar 3.1.2 is designed as a sliding rail or bar, a guiding profile, a sliding profile, a roller sliding rail or bar, a telescopic rail, a roller rail or bar, a ball roller rail, and/or a ball bearing rail for rolling the roller mechanism 4.4.1 on said connecting bar 3.1.2. In particular, the connecting bar 3.1.2 can be designed like a framework in order to save material and weight. The door handle 3 and its handle support structure 3.1 are mounted so as to be movable about the pivot axis D1 relative to the vehicle body.

The adjusting mechanism 4 comprises the drive unit 4.1, which is in particular fixed to the vehicle, and the force transfer element 4.4 which can be moved relative to the drive unit 4.1, to the vehicle body, and to the door handle 3. The drive unit 4.1 is arranged in particular below the handle support structure 3.1 and the force transfer element 4.4.

The drive unit 4.1 is designed in particular as a linear drive unit. The force transfer element 4.4 is provided for transferring and transmitting linear back-and-forth movements, in particular pushing or pulling forces, of the drive unit 4.1, and deflecting said linear movements LB into a movement, in particular an opening or closing movement OB, of the door handle 3. The linear movement LB, in particular a vertical extension or retraction movement in the direction of a vertical axis Z of the drive unit 4.1 is transferred into the opening or closing movement OB, in particular into a pivoting movement of the door handle 3, by means of the force transfer element 4.4.

For example, a free end of the handle support structure 3.1 is mounted so as to rotate about the pivot axis D1. For this purpose, the free ends of the holding bars 3.1.1 facing away from the door handle 3, have through openings 3.2 by means of which the handle support structure 3.1 is mounted on a bearing element 3.3 so as to rotate about the pivot axis D1. The handle support structure 3.1 is firmly connected to the door handle 3 by means of the free ends of the holding bars 3.1.1, which door handle is not shown in FIG. 2 to 4, but it is shown in FIG. 10 to 13. In particular, this end of the handle support structure 3.1 is firmly connected to a rear face of the door handle 3 that is not visible to a user.

When the door handle 3 is automatically moved from the starting or non-use position P1 into the use position P2, the handle support structure 3.1 is pivoted about the pivot axis D1, the door handle 3 firmly connected to the handle support structure 3.1 also being pivoted about the pivot axis D1.

The part of the adjusting mechanism 4 that is fixed to the body is firmly connected to the vehicle 1, such that, when the door handle 3 is extended, the extendable part is moved relative to the part that is fixed to the body. The part of the adjusting mechanism 4 that is fixed to the body comprises the drive unit 4.1. The roller mechanism 4.4.1 can comprise several rollers for converting or transferring the linear movement LB into the opening and closing movement OB and/or for support.

In particular, the roller mechanism 4.4.1 comprises at least one guiding roller 4.5 and two outer bearing rollers 4.6.

The part of the door handle assembly TA that is fixed to the body also comprises the control unit 4.2, the detection unit 4.3, and the sensor unit 4.8, which, however, are not shown in FIG. 2 to 13.

When the door handle 3 is adjusted from the starting or non-use position P1 into the use position P2, the at least one guiding roller 4.5 rolls on the handle support structure 3.1, in particular the connecting bar 3.1.2. The guiding roller 4.5 and the connecting bar 3.1.2 are operatively connected, in particular coupled in terms of movement, such that the guiding roller 4.5 rolling on the connecting bar 3.1.2 effects an opening or pivoting movement of the door handle 3 about the pivot axis D1. For this purpose, the guiding roller 4.5 rests against a rear face of the connecting bar 3.1.2 that is firmly connected to the door handle 3.

The drive unit 4.1 is in particular a linear drive device which has, for example, an electrically driven output rod or push rod. For example, the drive unit 4.1 comprises an electric motor 4.1.1 and, on the output side, an output element 4.1.2 which, when the drive unit 4.1 is active, is moved linearly back and forth according to the linear movement LB. At an end of the output element 4.1.2 facing away from the drive unit 4.1, the force transfer element 4.4 is connected to the output element 4.1.2.

The force transfer element 4.4 comprises a bearing structure 4.4.2 on which the guiding roller 4.5 and/or the bearing rollers 4.6 are rotatably mounted.

The output element 4.1.2 on the output side is designed in particular as an output rod, for example a push rod or pull rod.

In the embodiment shown, the guiding roller 4.5 and the bearing rollers 4.6 are mounted in the bearing structure 4.4.2 so as to rotate about a rotational axis D2. The rotational axis D2 extends, for example, in parallel with the longitudinal axis X of the vehicle 1 when the door handle 3 is arranged on a side door of the vehicle 1.

The rollers—the guiding roller 4.5 and the bearing rollers 4.6—are arranged between the holding bars 3.1.1 so as to face a rear face of the connecting bar 3.1.2. The rollers—guiding roller 4.5 and bearing rollers 4.6—are arranged next to one another and spaced apart from one another along the longitudinal axis X.

The base surface of the guiding roller 4.5 is in contact with the rear face of the connecting bar 3.1.2 during a movement between the open position and the closed position of the force transfer element 4.4. For example, the connecting bar 3.1.2 has a guiding bar 3.1.3 in the contact region with the guiding roller 4.5. The guiding bar 3.1.3 stands out from the surface of adjoining regions of the connecting bar 3.1.2 in order to allow a secure contact between the guiding roller 4.5 and the guiding bar 3.1.3.

When the drive unit 4.1 is activated to move the door handle 3 from the starting or non-use position P1 into the use position P2, the output element 4.1.2 is moved upwards along the vertical axis Z, which results in an upward movement of the force transfer element 4.4 and in particular the bearing structure 4.4.2. The guiding roller 4.5 rotates along the rear face of the connecting bar 3.1.2, in particular on the guiding bar 3.1.3, upward in the direction of the vertical axis Z.

The pushing force of the output element 4.1.2 and thus the linear movement LB thereof upward is transferred into an opening movement OB, in particular a rotational movement and resulting in a pivoting movement, of the handle support structure 3.1 firmly connected to the door handle 3, such that said handle support structure is pivoted about the pivot axis D1.

To retract or lower the door handle 3 from the use position P2 back into the non-use position P1, the handle support structure 3.1 is pivoted back about the pivot axis D1. The output element 4.1.2 is moved downward along the vertical axis Z, which results in a downward movement of the force transfer element 4.4 and in particular the bearing structure 4.4.2 thereof. The guiding roller 4.5 rotates along the rear face of the connecting bar 3.1.2 on the guiding bar 3.1.3 downward in the direction of the vertical axis Z. The now occurring tensile force of the output element 4.1.2 and thus the linear movement LB thereof downward is transferred into a closing movement, in particular a rotational movement and resulting in a pivoting movement of the handle support structure 3.1 firmly connected to the door handle 3, such that said handle support structure is pivoted back about the pivot axis D1, unless the above-mentioned exceptional case occurs, in which the door handle is not or is not fully retracted.

Figure 6:
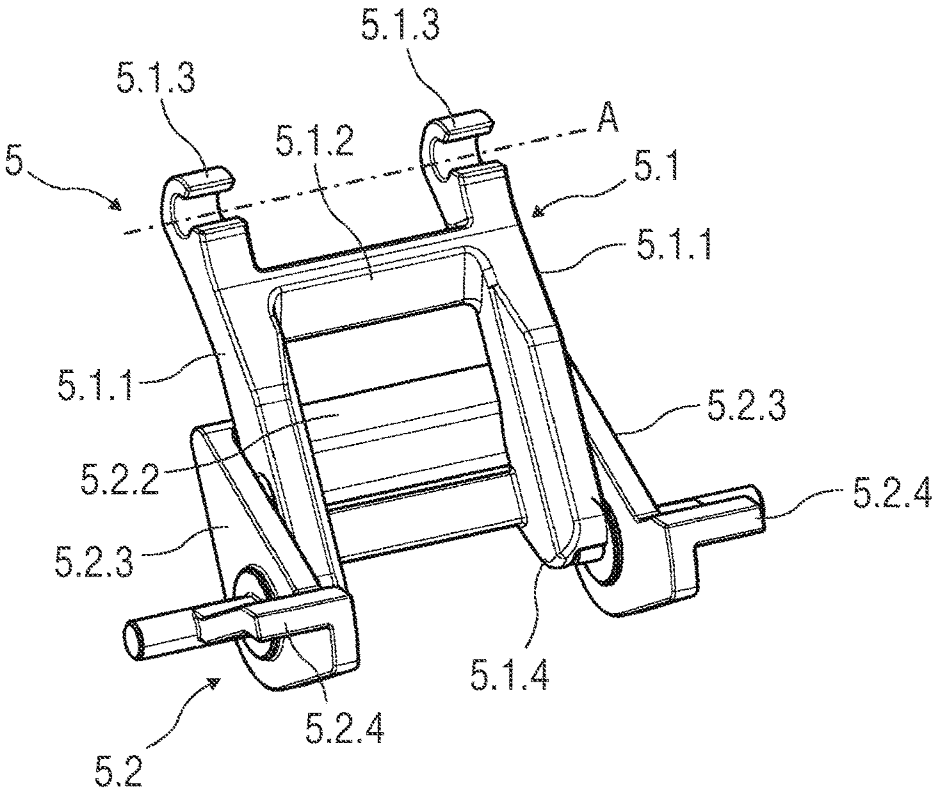
FIG. 6 is a schematic view of the retraction device.
Figure 7:
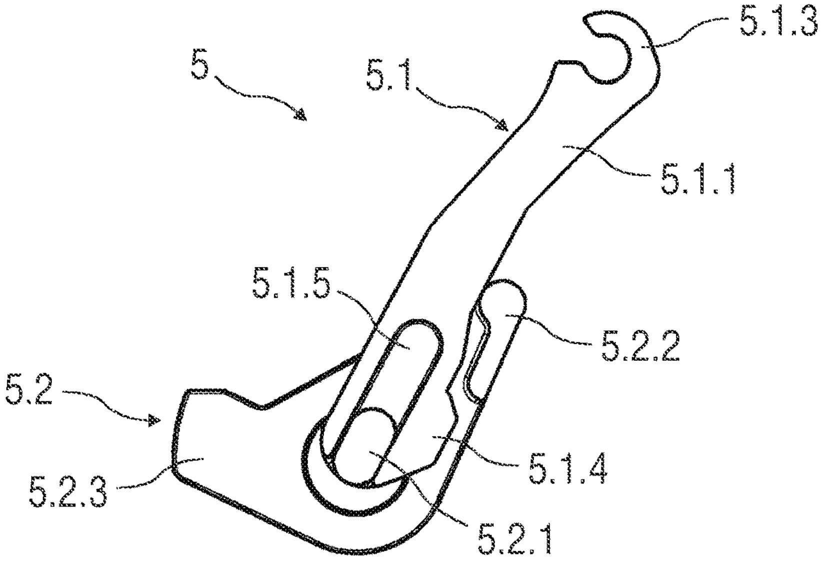
FIG. 7 is a different, schematic view of the retraction device.
Figure 8:
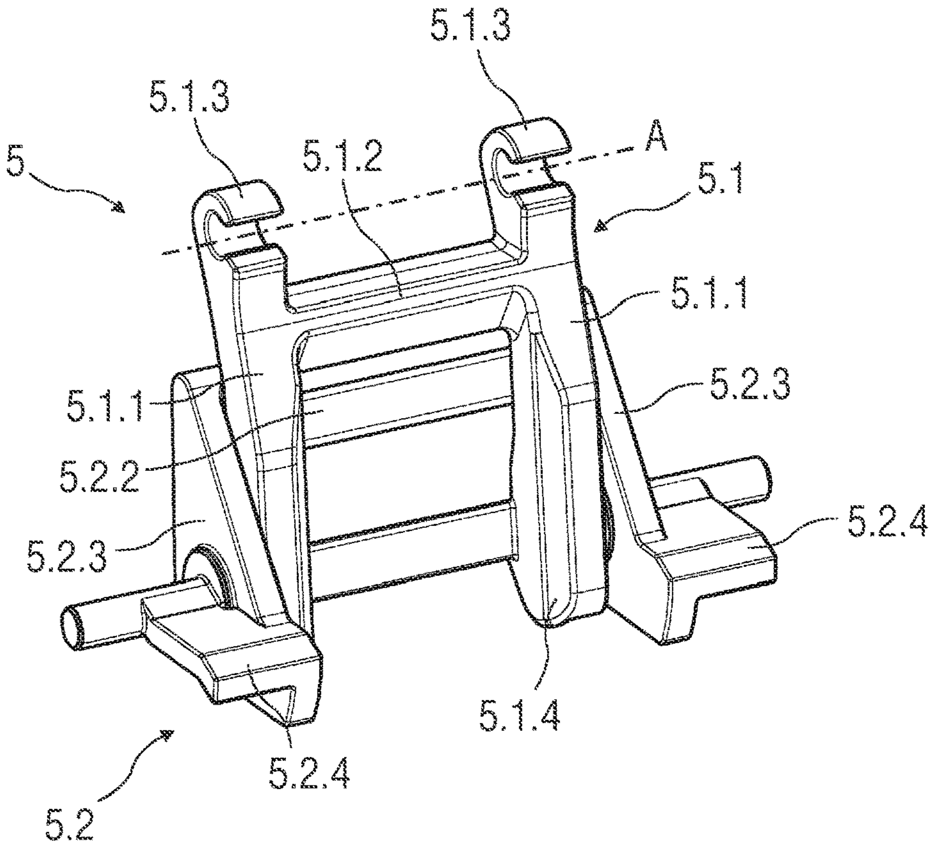
FIG. 8 is a different, schematic view of the retraction device.
Figure 9:
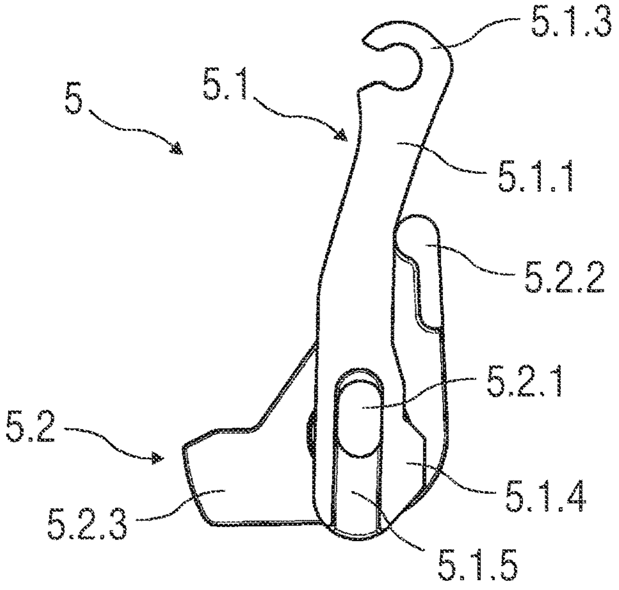
FIG. 9 is a different, schematic view of the retraction device.

As already stated above, in the exceptional case that the door handle does not assume the starting or non-use position P1 in the closed position of the force transfer element 4.4, the retraction device 5 serves to move the door handle 3 into the starting or non-use position P1. The retraction device 5 has a lever mechanism by means of which the handle support structure 3.1 is pivotable about the pivot axis D1. The lever mechanism is formed by a first lever element 5.1 and a second lever element 5.2, which are shown in FIG. 6 to 9, FIGS. 6 and 7 showing a first position of the lever elements 5.1, 5.2 relative to one another and FIGS. 8 and 9 showing a second position of the lever elements 5.1, 5.2 relative to one another, and FIGS. 6 and 8 showing perspective views, and FIGS. 7 and 9 showing sectional views of the retraction device 5. The first lever element 5.1 is designed like a ladder having two parallel spars 5.1.1 and a rung 5.1.2 connecting the two spars 5.1.1. A first spar end 5.1.3 of each spar 5.1.1 is designed like a hook and is suspended in the connecting bar 3.1.2 of the handle support structure 3.1 such that it can be pivoted about a coupling axis A parallel to the pivot axis D1, see FIG. 5. The second spar end 5.1.4 of each spar 5.1.1 has an elongated recess 5.1.5 into which a pin 5.2.1 engages, which pin couples the spar 5.1.1 to the second lever element 5.2 so as to be slidable along the recess 5.1.5. The second lever element 5.2 has a rear wall 5.2.2 against which the spars 5.1.1 rest, and two side walls 5.2.3, from which the pins 5.2.1 for the spars 5.1.1 protrude. Furthermore, a contact wing 5.2.4 is formed on each side wall 5.2.3, which contact wing protrudes to an outside and to the front from the side wall 5.2.3. The contact wings 5.2.4 are arranged below the force transfer element 4.4.

Figure 10:
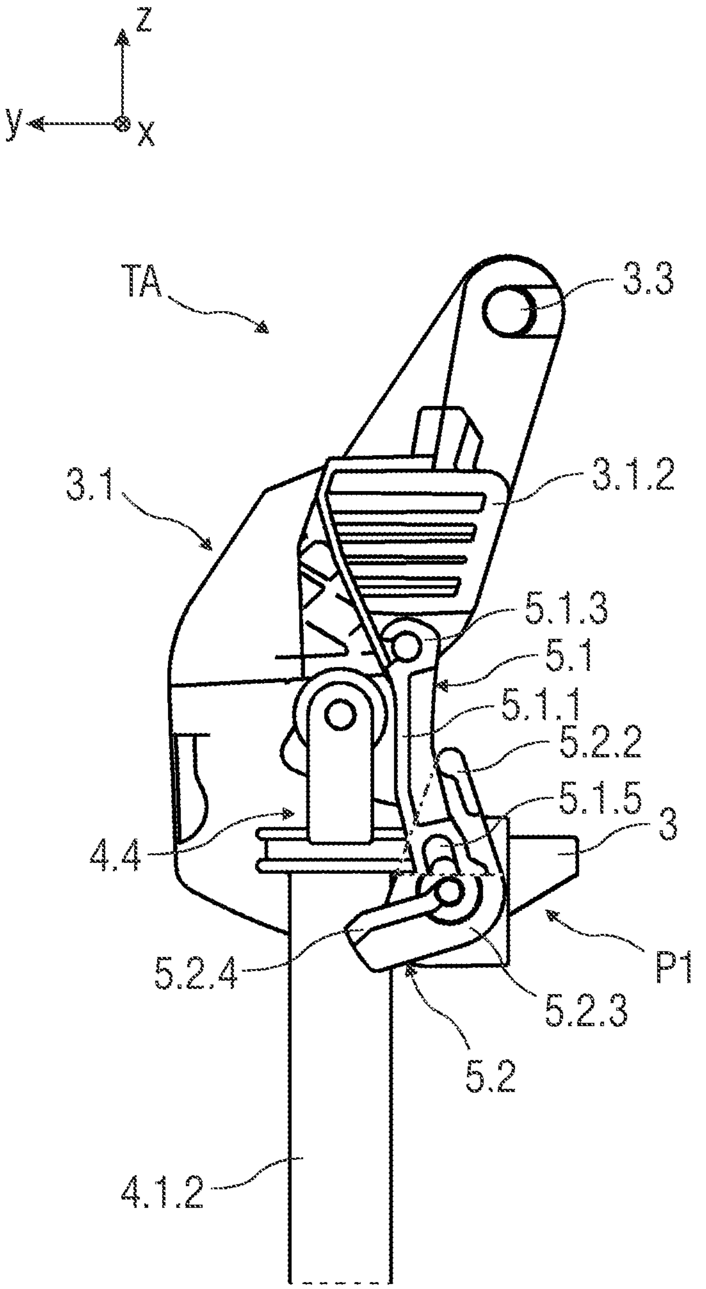
FIG. 10 is a schematic sectional view of the door handle assembly in one position of the door handle, a force transfer element, and the retraction device.

FIG. 10 to 13 show different positions of the door handle 3, the force transfer element 4.4, and the retraction device 5, on the basis of which the function of the retraction device 5 is described below. In these figures, a part of a side wall 5.2.3 of the second lever element 5.2 of the retraction device 5, indicated by dashed lines, is not shown in order to illustrate the positions of the first lever element 5.1 located behind it. FIG. 10 shows the normal case with the force transfer element 4.4 in its closed position and the door handle in the starting or non-use position P1. The contact wings 5.2.4 are located below the force transfer element 4.4 and at a distance from the force transfer element 4.4.

Figure 11:
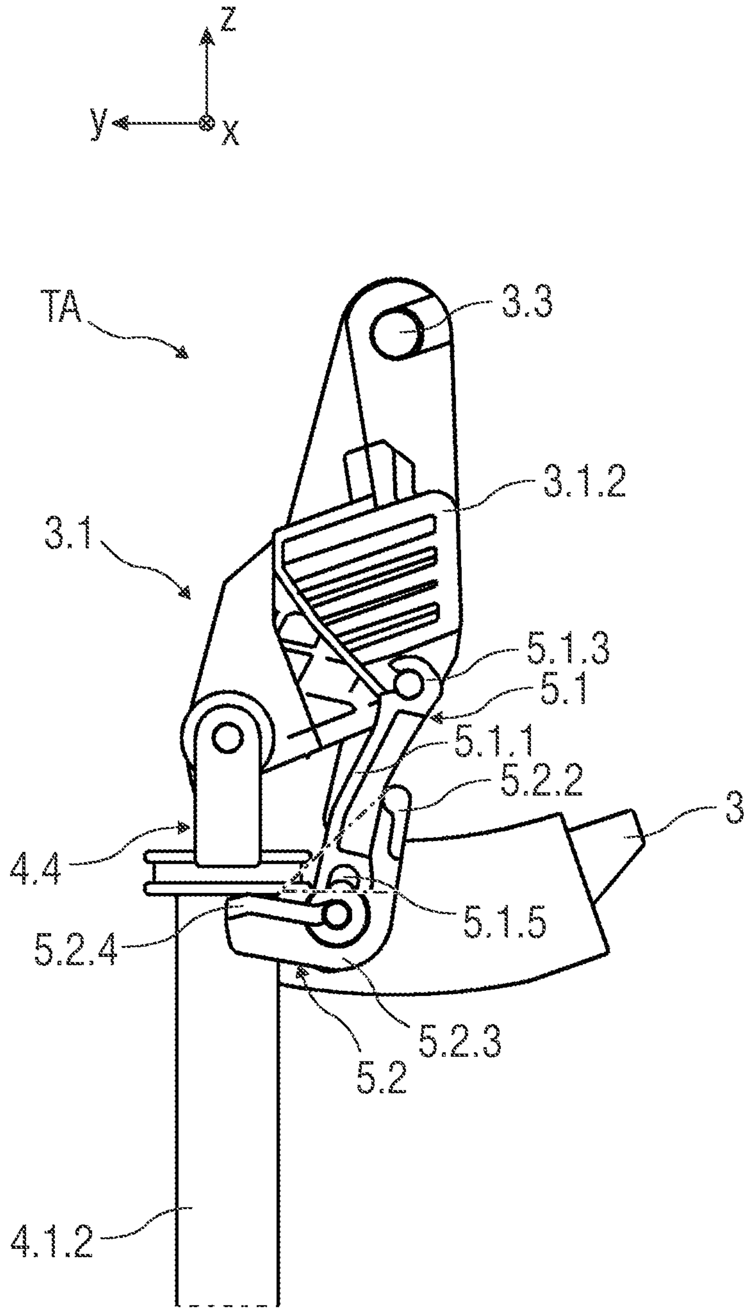
FIG. 11 is another schematic sectional view of the door handle assembly in another position of the door handle, a force transfer element, and the retraction device

FIG. 11 shows the exceptional case that the door handle 3 does not assume the starting or non-use position P1 in the closed position of the force transfer element 4.4. In this case, the force transfer element 4.4 is moved downwards by the drive unit 4.1. During this movement, the force transfer element 4.4 is not in direct contact with the handle support structure 3.1, but makes contact with the retraction device 5 and thereby acts indirectly, namely via the retraction device 5, on the handle support structure 3.1.

Figure 12:
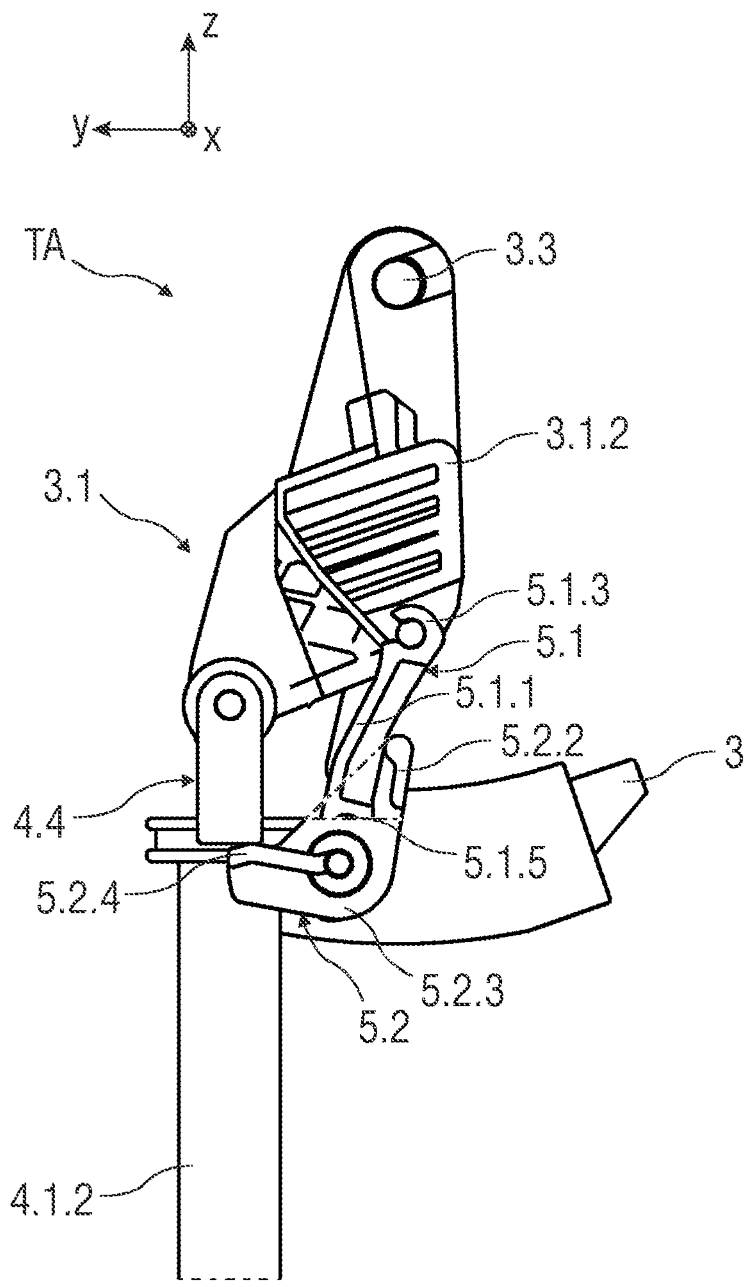
FIG. 12 is another schematic sectional view of the door handle assembly in another position of the door handle, a force transfer element, and the retraction device

FIG. 12 shows that the force transfer element 4.4 makes contact with the contact wings 5.2.4 of the second lever element 5.2 during the downward movement of the force transfer element 4.4 from its closed position. The further downward movement of the force transfer element 4.4 pushes the contact wings 5.2.4 downwards and thereby moves the retraction device 5, wherein the lever mechanism of the retraction device 5 causes a pivoting movement of the handle support structure 3.1 and the door handle 3 about the pivot axis D1, which pivoting movement pivots the door handle 3 to the starting or non-use position P1.

Figure 13:
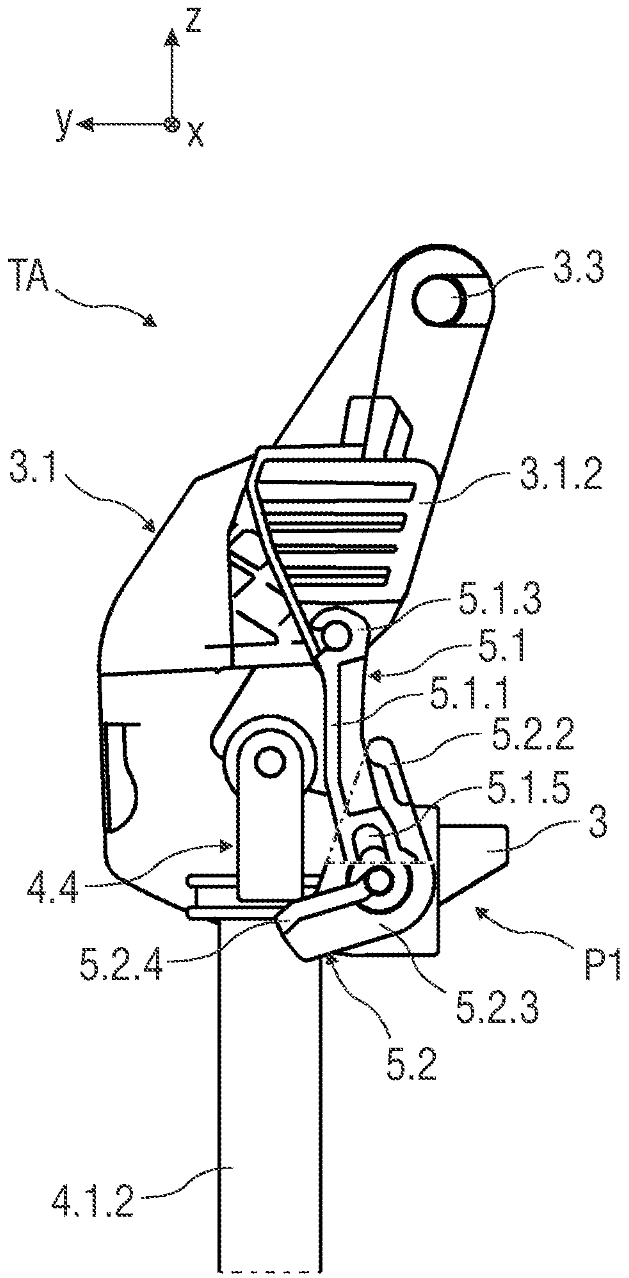
FIG. 13 is another schematic sectional view of the door handle assembly in another position of the door handle, a force transfer element, and the retraction device

FIG. 13 shows the force transfer element 4.4 in the resulting correcting position, in which the door handle 3 is retracted back into the starting or non-use position P1. The force transfer element 4.4 is then moved back into the closed position by the drive unit 4.1, so that the door handle assembly TA is again in the normal position shown in FIG. 10.

LIST OF REFERENCE SIGNS

1 Vehicle
2 Vehicle door
3 Door handle
3.1 Handle support structure
3.1.1 Holding bars
3.1.2 Connecting bar
3.1.3 Guiding bar
3.2 Through opening
3.3 Bearing element
4 Adjusting mechanism
4.1 Drive unit
4.1.1 Electric motor
4.1.2 Output element
4.2 Control unit
4.3 Detection unit
4.4 Force transfer element
4.4.1 Roller mechanism
4.4.2 Bearing structure
4.5 Guiding roller
4.6 Bearing roller
4.8 Sensor unit
5 Retraction device
5.1 First lever element
5.1.1 Spar
5.1.2 Rung
5.1.3 First spar end
5.1.4 Second spar end
5.1.5 Recess
5.2 Second lever element
5.2.1 Pin
5.2.2 Rear wall
5.2.3 Side wall
5.2.4 Contact wing
A Coupling axis
D1 Pivot axis
D2 Rotational axis
LB Linear movement
OB Opening or closing movement
P1 Non-use position
P2 Use position
TA Door handle assembly
X Longitudinal axis
Y Transverse axis
Z Vertical axis

The invention claimed is:

1. A door handle assembly, comprising:

an adjustable door handle having a handle support structure; and an adjusting mechanism for adjusting the door handle between a starting or non-use position and a use position, wherein the adjusting mechanism comprises at least one drive unit, a force transfer element, and a retraction device coupled to the handle support structure, wherein the retraction device is comprised of a first lever element with hooks that pivotally engage pins in the handle support structure wherein the force transfer element comprises a plurality of rollers biased by a vertical motion pusher of the at least one drive unit, wherein a roll path of one of the rollers on a connecting bar of the handle support structure extends between the hooks and pins.

2. The door handle assembly according to claim 1, wherein the adjusting mechanism has at least one bearing element on which the handle support structure and the door handle are arranged so as to be pivotable about a pivot axis.

3. The door handle assembly according to claim 2, wherein the retraction device has a lever mechanism by means of which the handle support structure is pivotable about the pivot axis.

4. The door handle assembly according to claim 1, wherein the drive unit is activated automatically in order to move the force transfer element from the closed position into the correcting position if the door handle does not assume the starting or non-use position in the closed position of the force transfer element.

5. The door handle assembly according to claim 4, further comprising a sensor unit which is set up to detect whether the door handle assumes the starting or non-use position in the closed position of the force transfer element.

6. The door handle assembly according to claim 5, further comprising a control unit which is set up to activate the drive unit as a function of a sensor signal from the sensor unit.

7. The door handle assembly according to claim 6, wherein the control unit is set up to activate the drive unit for moving the force transfer element from the correcting position into the closed position.

8. The door handle assembly according to claim 1, wherein the drive unit is designed as a linear drive unit having an output element on the output side, which output element is connected to the force transfer element.

9. The door handle assembly according to claim 1, wherein the closed position of the force transfer element is arranged between the open position and the correcting position.

10. A vehicle having at least one movable element which comprises a door handle assembly according to claim 1.

11. The door handle assembly according to claim 1, wherein the retraction device is comprised of the first lever element having a rung extending between two spars.

12. The door handle assembly according to claim 1, wherein the retraction device is comprised of the first lever element having two spars having hooked first ends and second ends pinned to the second lever element.

13. The door handle assembly according to claim 1, wherein the retraction device is comprised of the first lever element with at least one spar having a recess in a first end that accommodates a sliding pin from the second lever element.

14. The door handle assembly according to claim 1, wherein the first lever element has an elongated recess in which a pin of the second lever element is received.

15. The door handle assembly according to claim 1, wherein the second lever element has a rear wall that supports the first lever element.

* * * * *